(12) United States Patent
Golden et al.

(10) Patent No.: US 7,482,560 B2
(45) Date of Patent: Jan. 27, 2009

(54) MICROWAVEABLE LAMINATE CONTAINER HAVING ENHANCED COOKING FEATURES AND METHOD FOR THE MANUFACTURE THEREOF

(75) Inventors: Craig A. Golden, Powell, OH (US);
David C. Schiltz, Columbus, OH (US);
Jim E. Bunds, Columbus, OH (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 11/197,875

(22) Filed: Aug. 5, 2005

(65) Prior Publication Data

US 2006/0049189 A1      Mar. 9, 2006

Related U.S. Application Data

(60) Provisional application No. 60/599,813, filed on Aug. 6, 2004.

(51) Int. Cl.
*H05B 6/80* (2006.01)
*B65D 81/34* (2006.01)

(52) U.S. Cl. .................. 219/728; 219/729; 219/732; 219/762; 99/DIG. 14; 426/107; 426/234

(58) Field of Classification Search ......... 219/725–735, 219/762; 99/DIG. 14; 426/107, 109, 113, 426/234, 241, 243
See application file for complete search history.

(56) References Cited

U.S. PATENT DOCUMENTS

| | | | |
|---|---|---|---|
| 3,219,460 A | * | 11/1965 | Brown .................. 426/107 |
| 3,547,661 A | | 12/1970 | Stevenson |
| 4,013,798 A | | 3/1977 | Goltsos |
| 4,122,324 A | | 10/1978 | Falk .................. 219/10.55 E |
| 4,223,194 A | | 9/1980 | Fitzmayer ............ 219/10.55 |
| 4,592,914 A | | 6/1986 | Kuchenbecker |
| 4,626,641 A | | 12/1986 | Brown et al. .......... 219/10.55 E |
| 4,865,858 A | | 9/1989 | Petcavich .............. 426/243 |
| 4,866,234 A | | 9/1989 | Keefer |
| 4,876,428 A | * | 10/1989 | Petcavich .............. 219/732 |
| 4,972,059 A | | 11/1990 | Wendt et al. .......... 219/10.55 |

(Continued)

FOREIGN PATENT DOCUMENTS

EP      0 271 981      6/1988

(Continued)

*Primary Examiner*—Philip H Leung
(74) *Attorney, Agent, or Firm*—Baker Botts L.L.P.

(57) ABSTRACT

Microwaveable container that provides for accelerated microwave cooking times and more uniform internal temperature distribution. The container is manufactured from a laminate structure, the laminate structure including a first layer of microwave-transparent material and a second layer of microwave-reflective material. The second layer has at least one aperture defined therein, the at least one aperture having a width dimension W, a length dimension L, and a perimeter dimension P. The aperture is sized such that at least one of the width dimension W or length dimension L is sized about an energy maximum. Accordingly, the width and/or the length dimension is defined as within ⅛λ of a predetermined dimension D. The predetermined dimension is equal to ¼λ+n(½)λ, wherein n is an integer and λ is a microwave wavelength associated with a predetermined range of microwave frequencies. Preferably, the predetermined range of microwave frequencies is between about 2.0-3.0 GHz.

21 Claims, 11 Drawing Sheets

U.S. PATENT DOCUMENTS

| | | | |
|---|---|---|---|
| 5,416,304 A | 5/1995 | De La Cruz et al. | 219/730 |
| 5,519,195 A | 5/1996 | Keefer et al. | 219/728 |
| 6,102,281 A | 8/2000 | Lafferty et al. | 229/185.1 |
| 6,552,315 B2 | 4/2003 | Zeng et al. | 219/728 |
| 6,777,655 B2 | 8/2004 | Zhang et al. | 219/725 |

FOREIGN PATENT DOCUMENTS

| | | |
|---|---|---|
| EP | 0 916 594 | 5/1999 |
| GB | 2 112 257 | 7/1983 |
| GB | 2 243 981 | * 11/1991 |

* cited by examiner

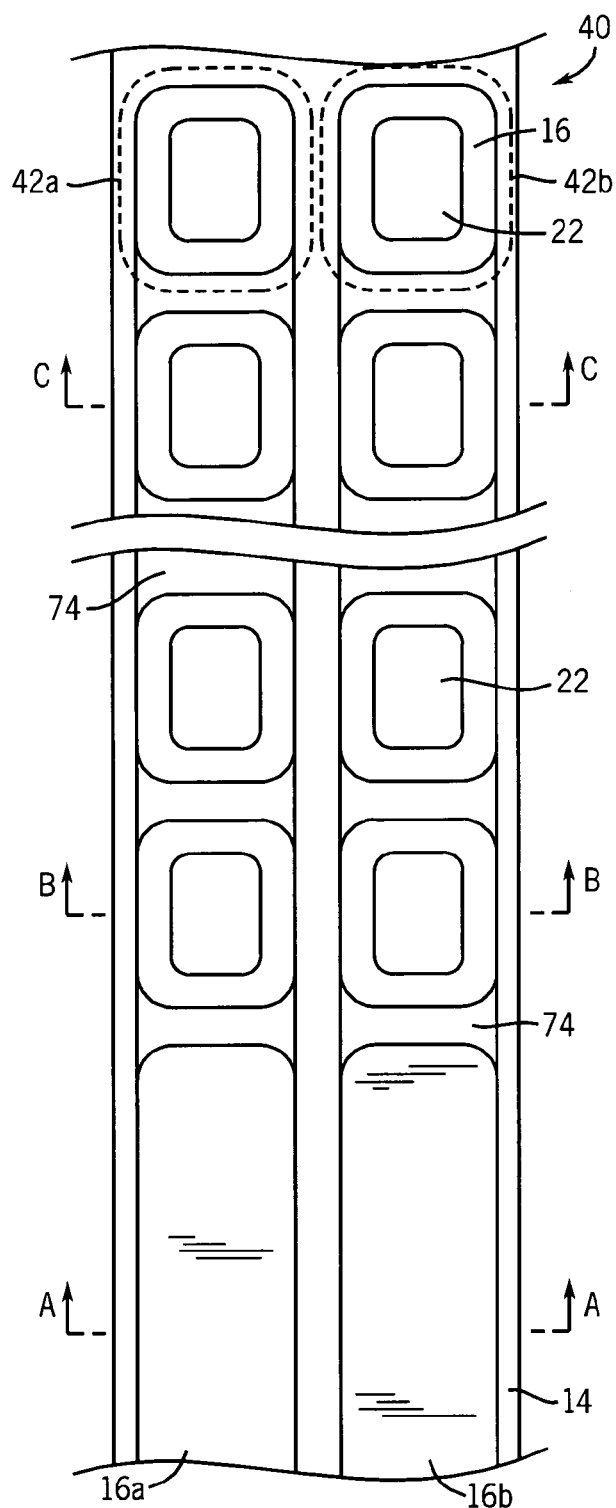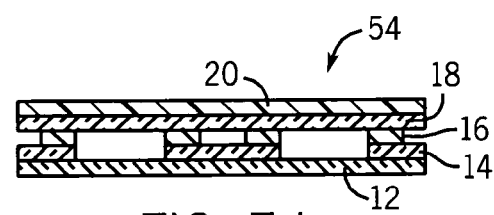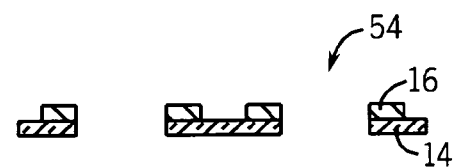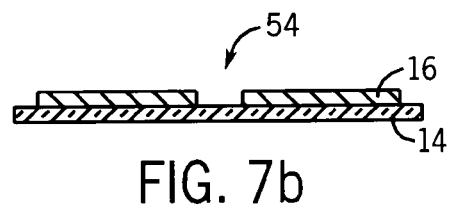
FIG. 7a
FIG. 7b
FIG. 7c
FIG. 7d

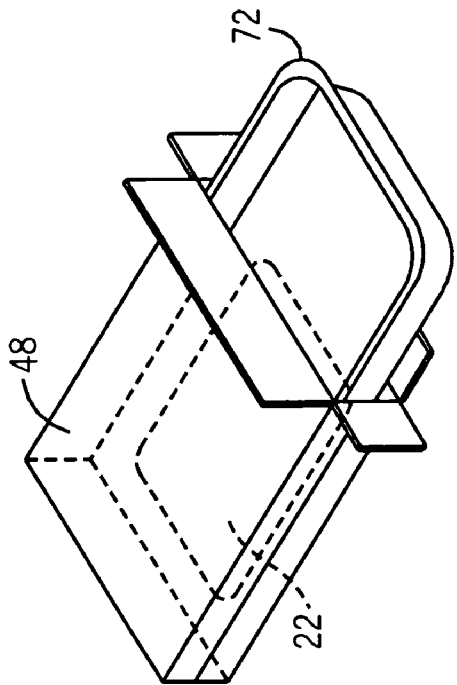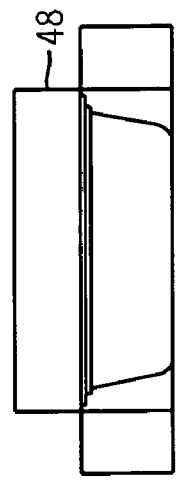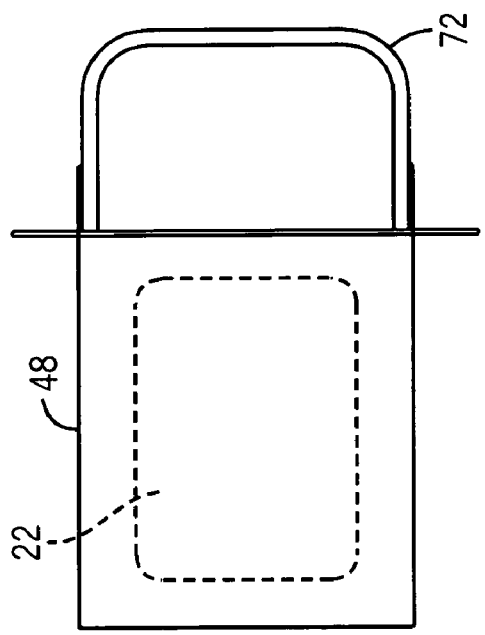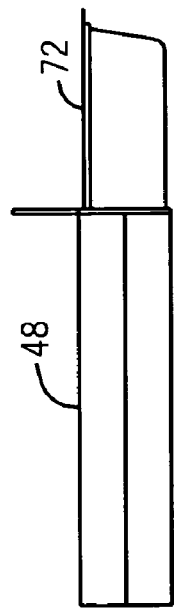
FIG. 12b
FIG. 12d
FIG. 12a
FIG. 12c

MICROWAVEABLE LAMINATE CONTAINER HAVING ENHANCED COOKING FEATURES AND METHOD FOR THE MANUFACTURE THEREOF

CROSS REFERENCE TO RELATED APPLICATIONS

This application claims the benefit under 35 U.S.C. § 119(e) of U.S. Patent Application No. 60/599,813 filed on Aug. 6, 2004, the contents of which are expressly incorporated herein by reference thereto.

FIELD OF THE INVENTION

The present invention relates to a laminate container. Particularly, the present invention is directed to a microwaveable laminate container that decreases the time required to heat a food product and provides a more uniform temperature distribution within the food product.

BACKGROUND OF THE INVENTION

Microwave ovens have become a principle form of rapidly and effectively cooking and/or heating food products. Accordingly, the variety and type of food products available for preparation in microwave ovens is constantly increasing. Despite the convenience of heating offered by the microwave oven, the commercial success of many microwaveable food products has been limited by problems associated with heating such food products with microwave energy. For example, such problems are generally related to the quality of the food product and include overcooked portions, colds spots and burnt edges. Accordingly, there exists a continuing demand to improve the manner in which food products are heated in a microwave oven while decreasing the time required to heat the food products to an acceptable temperature.

Frequently, food products that are prepared for cooking or heating within a microwave oven are delivered to the consumers in containers that may be used directly within the microwave oven. These containers generally are intended to minimize problems typically associated with the microwaving of food products by attempting to more uniformly heat the food products.

A variety of prior art packages and containers have attempted to provide improved heating uniformity, modified power absorption, and selective heating. One common technique known in the art is to provide packages with a shielding technology to promote a more uniform heating within the food product. For example, a microwave-reflective material is often used to shield the microwave energy and redistribute the energy. Accordingly, various prior art containers utilize microwave-reflective material to shield and redistribute energy within the food product. Generally, the microwave-reflective material is positioned within the tray to define areas which completely reflect the microwave energy and areas which are completely transparent to the microwave energy. For example, U.S. Pat. No. 4,351,997 to Mattison et al., incorporated in its entirety by reference herein, discloses a container whose peripheral wall and rim is covered with a microwave-reflective material. The bottom of the tray, however, is essentially free of microwave-reflective material and thus provides an area which is essentially microwave-transparent. Additional containers which utilize microwave-reflective technology with the use of microwave-reflective material are disclosed in U.S. Pat. No. 5,117,078 to Beckett; U.S. Pat. No. 4,626,641 to Brown; U.S. Pat. No. 5,416,304 to De La Cruz; and U.S. Pat. No. 6,102,284 to Lafferty et al., each of whose disclosure is incorporated by reference herein.

While the microwave-reflective material is satisfactory in moderating the microwave energy of the food product within the container, the microwave-reflective material, in reflecting radiation away from the food product, may increase the cooking or heating time of the food product. Additionally, such techniques to moderate microwave energy may detrimentally impact the quality of the heated food product, such as, excessive moisture loss or the like. There thus remains a need for an efficient and economic container capable of providing for a more uniform heating of the food product therein, decreasing the required cook time and enhancing food product characteristics.

SUMMARY OF THE INVENTION

The purpose and advantages of the present invention will be set forth in and apparent from the description that follows, as well as will be learned by practice of the invention. Additional advantages of the invention will be realized and attained by the methods and products particularly pointed out in the written description and claims hereof, as well as from the appended drawings.

To achieve these and other advantages and in accordance with the purpose of the invention, as embodied and broadly described, the invention is directed to a microwaveable container which provides for a more uniform heating distribution, accelerated cooking and heating characteristics, enhanced moisture retention and reduction of edge burning of the food product. The microwaveable container generally has a base and a peripheral side wall extending from the base. The container is manufactured from a laminate structure, including a first layer of microwave-transparent material and a second layer of microwave-reflective material. The second layer has at least one aperture defined therein. The at least one aperture has a width dimension W, a length dimension L, and a perimeter dimension P. In accordance with the invention, the aperture is sized such that at least one of the width dimension or length dimension is defined as within $\frac{1}{8}\lambda$ of a predetermined dimension D, which is equal to $\frac{1}{4}\lambda + n(\frac{1}{2})\lambda$, where n is an integer and $\lambda$ is a microwave wavelength associated with a predetermined range of microwave frequencies. Preferably, the predetermined range of microwave frequencies is between about 2.0-3.0 GHz.

In accordance with a preferred aspect of the invention, at least one of the width or length dimensions of the aperture is defined as either within $\frac{1}{16}\lambda$, and more preferably within $\frac{1}{32}\lambda$ of the predetermined dimension D. In accordance with the most preferred aspect of the invention, at least one of the width or length dimensions of the aperture is defined as the predetermined dimension D. The aperture defined within the second layer is preferably disposed in and centered at the base of the container.

In accordance with a further aspect of the invention, the container further includes an intermediate layer of resin between the first layer and the second layer. In a preferred embodiment, the laminate structure of the container further includes a third layer of microwave-transparent material extending across the first layer and the second layer.

In accordance with a further aspect of the invention, the base and peripheral side wall are configured to define a structure selected from the group consisting of a tray, carton, package, box, shell, sleeve and bag.

The invention also includes a method of manufacturing a microwaveable container. The method includes the steps of providing a first layer of microwave-transparent material and providing a second layer of microwave-reflective material. The method further includes defining at least one aperture within the second layer, the at least one aperture having a width dimension W, a length dimension L, and a perimeter dimension P, wherein at least one of the width dimension W or length dimension L is defined as within 1/8λ of a predetermined dimension. The predetermined dimension D is equal to 1/4λ+n(1/2)λ, wherein n is an integer and λ is a microwave wavelength associated with a predetermined range of microwave frequencies. Thereafter, the method includes combining the first layer of microwave-transparent material and the second layer of microwave-reflective material to define a laminate member and shaping the laminate member into a container having a base and side wall.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the present invention. Together with the description, the drawings serve to explain the principles of the invention.

BRIEF DESCRIPTION OF THE DRAWINGS

FIG. 7a is a top view and FIG. 7b, FIG. 7c and FIG. 7d are cross-sectional side views of an another representative embodiment of the laminate web used to manufacture the microwaveable laminate container of the present invention.

FIG. 12a is a top view, FIG. 12b is a perspective view, FIG. 12c is a side view and FIG. 12d is a front view of an assembly including another representative embodiment of the microwaveable laminate container of the present invention.

DETAILED DESCRIPTION OF THE PREFERRED EMBODIMENT

Figure 1:
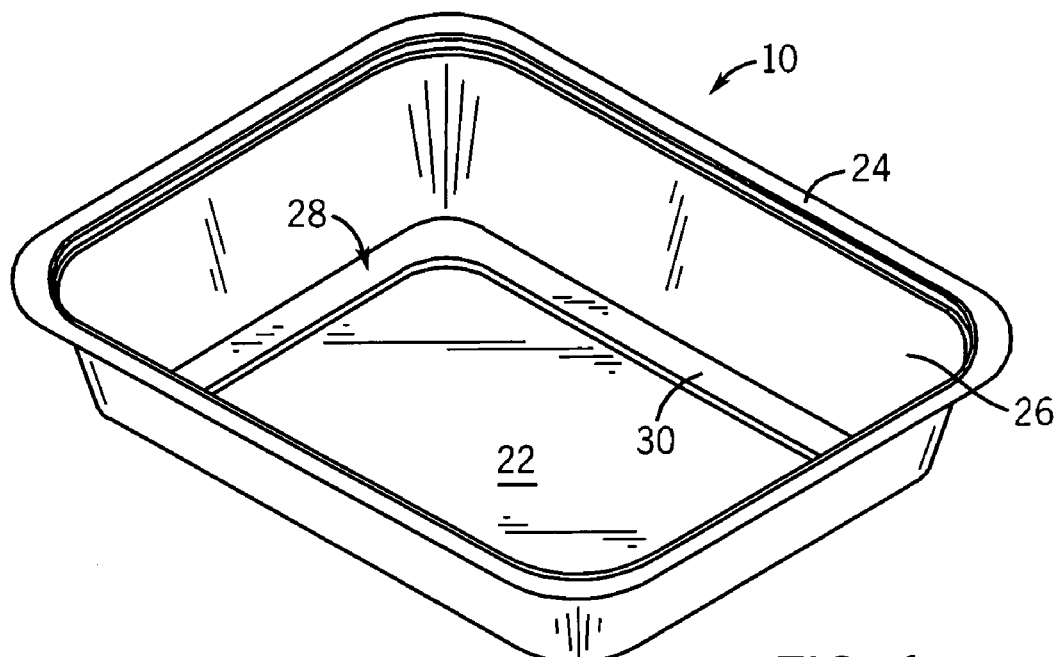
FIG. 1 is a perspective view of a representative embodiment of the microwaveable laminate container of the present invention.

Reference will now be made in detail to the present preferred embodiments of the invention, examples of which are illustrated in the accompanying drawings. A detailed description of the container of the present invention in conjunction with the method of corresponding steps of manufacturing the product will be described.

The methods and apparatus presented herein may be used for manufacturing a microwaveable container having a specifically sized aperture. The container of the present invention is particularly suited for accelerating the heating of a food product thereby reducing the cook time required for the microwaveable food product, increasing the moisture retention of the food product and eliminating or reducing the over-cooked or burnt edges of the food product. The microwaveable container generally has a base and a peripheral side wall extending from the base. The container is manufactured from a laminate structure, including a first layer of microwave-transparent material and a second layer of microwave-reflective material. The second layer has at least one aperture defined therein. The at least one aperture has a width dimension W, a length dimension L, and a perimeter dimension P. In accordance with the invention, the aperture is sized such that at least one of the width dimension or length dimension is defined as within 1/8λ of a predetermined dimension D, which is equal to 1/4λ+n(1/2)λ, where n is an integer and λ is a microwave wavelength associated with a predetermined range of microwave frequencies. Preferably, the predetermined range of microwave frequencies is between about 2.0-3.0 GHz. As described in further detail below, the container can include a variety of shapes and sizes. For purpose of explanation and illustration, and not limitation, an exemplary embodiment of the structure in accordance with the invention is shown in FIG. 1 and is designated generally by reference character 10.

Figure 2:
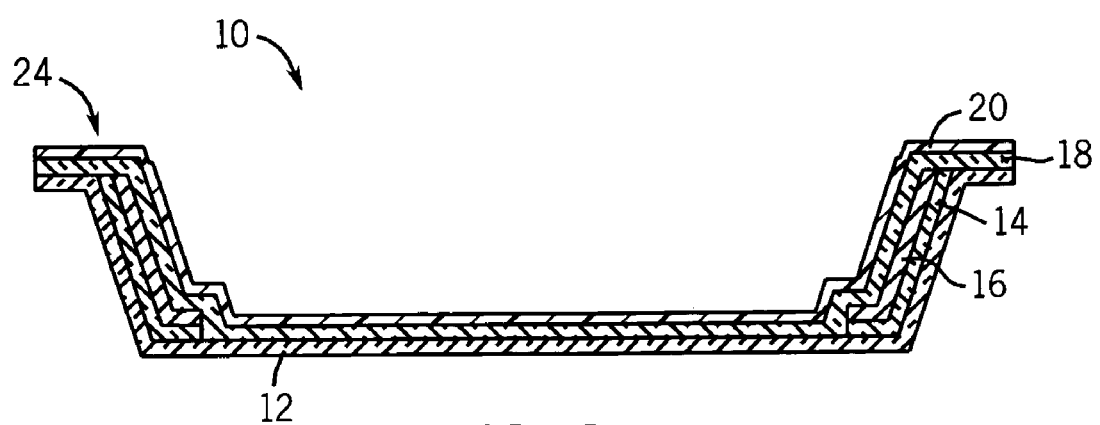
FIG. 2 is a cross-sectional view of the microwaveable laminate container shown in FIG. 1.

Referring to FIGS. 1 and 2, the structure of the present invention includes a container 10 formed from a multi-layer laminate structure. The container is fashioned to support a food product placed therein. The container has a base 28 and a peripheral side wall 26 extending from the base. For purposes of illustration and not limitation, as embodied herein and as depicted in FIGS. 1 and 2, the laminate structure includes a layer of microwave-transparent material 12 and a layer of microwave-reflective material 16. As depicted, the layer of microwave-reflective material is supported on a substrate layer 14, the substrate also comprised of a microwave-transparent layer. The container 10 of the present invention has an aperture or opening 22 formed within the microwave-reflective layer. The aperture is entirely free of microwave-reflective material and is dimensioned to allow peak microwave energy to penetrate and optimize heating of the food product therein.

Figure 3:
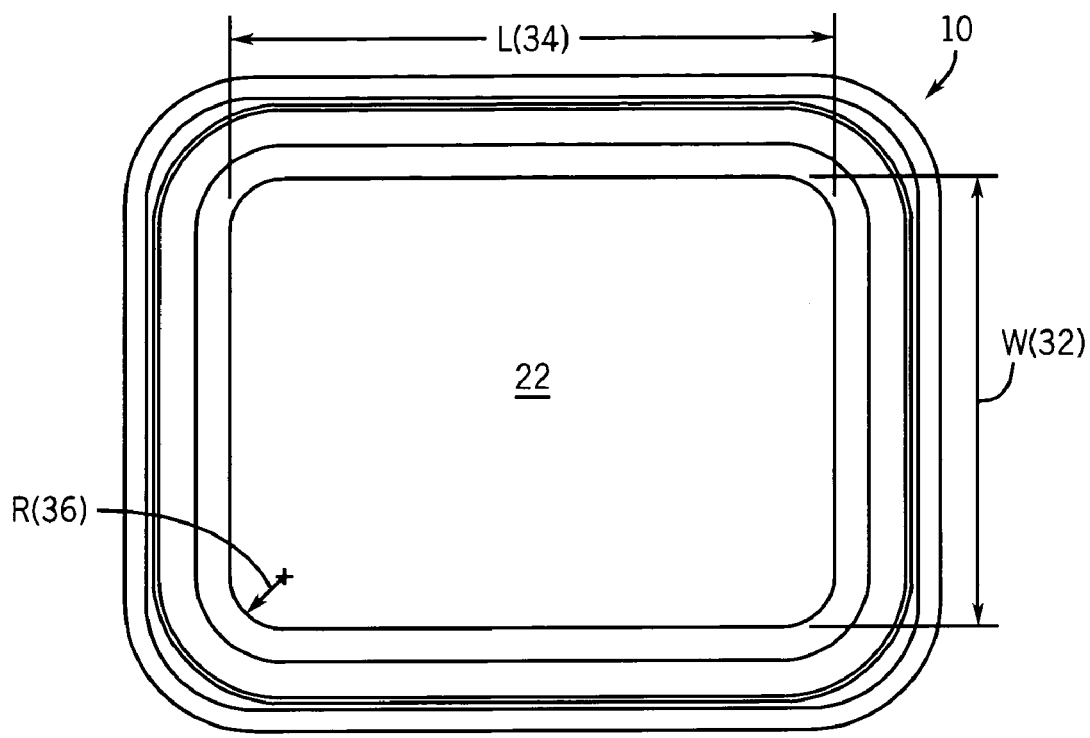
FIG. 3 is a top view of the microwaveable laminate container shown in FIG. 1.

Referring to FIG. 3, the microwave-reflective layer has at least one aperture defined therein. As depicted in the embodiment of FIGS. 1-3, and in accordance with a preferred embodiment of the invention, a single aperture is defined within the microwave-reflective layer. The aperture has a width dimension (W), a length dimension (L) and a perimeter dimension (P). The aperture is sized about an energy maximum or microwave energy peak such that those waves which are at or approximate to the peak wave forms in phase penetrate the container to the food product contained therein and allow for optimum heating. The aperture is specifically sized to promote accelerated microwave cooking or heating times, a more uniform food product temperature distribution, enhanced moisture retention and elimination or reduction of overcooked or burnt food product edges. The aperture is sized not only to interact with the microwave energy but it is also specifically tuned to the microwave energy. In accordance with one embodiment of the invention, the aperture is sized such that at least one of the width dimension or the length dimension of the aperture is defined as at least within $1/8\lambda$ of an energy maximum defined as predetermined dimension D. The energy maximum or predetermined dimension D is equal to $1/4\lambda+n(1/2)\lambda$, where n is an integer and $\lambda$ is a microwave wavelength associated with a predetermined range of microwave frequencies. Preferably, the aperture is sized such that at least one of the width or length dimensions is defined as within $1/16\lambda$ of the predetermined dimension D. More preferably, however, the aperture is sized such that at least one of the width or length dimensions is defined as within $1/32\lambda$ of the predetermined dimension D. Most preferably, the aperture is sized such that at least one of the width or length dimensions is equal to the predetermined dimension D.

In a preferred embodiment of the invention, however, the aperture is sized such that both the width and length dimensions of the aperture are defined as at least within $1/8\lambda$ of the predetermined dimension D. Preferably, and in further accordance with this embodiment of the invention, the aperture is sized such that both the width and length dimensions are defined as within $1/16\lambda$ of the predetermined dimension D. More preferably, however, the aperture is sized such that both the width and length dimensions are defined as within $1/32\lambda$ of the predetermined dimension D. Most preferably, the aperture is sized such that both the width and length dimensions are equal to the predetermined dimension D.

Particularly, the wavelengths used to size the aperture are those wavelengths associated with a predetermined range of microwave frequencies. Generally, the predetermined range of frequencies is between about 1 and 40 GHz. In a more preferred embodiment, the predetermined range of frequencies is between about 1.0-10.0 GHz. Preferably, however, the container is used in a conventional microwave oven such that the microwave frequency is equal to 2.45 GHz.

The at least one aperture of the present invention can be positioned in any part of the container. More preferably, however, the single aperture or multiple apertures are located in the base and/or lid of the container. As illustrated in FIGS. 2 and 3 and in accordance with a preferred embodiment of the invention, the aperture is disposed and centered at the base. The aperture is sized about an energy maxima and has an area A. Depending upon the dimensions of the base, the area A can be maximized relative to the base such that, for example, it is equal to the area of the base. More preferably, however, the area of the aperture is sized such that the area is maximized relative to the base and a border of microwave-reflective surrounds the aperture. In the container embodied herein and as depicted in FIGS. 1-3, a border 30 of microwave-reflective material is provided to surround the aperture 22. This border can assist in establishing a more uniform temperature gradient and reducing microwave cook time. For purposes of illustration and not limitation, as embodied herein and as depicted in FIGS. 1-3, the base of the container is a flat planar surface. However, the base can be configured to include, for example, ridges, slopes, elevated surfaces and the like or any combination thereof.

The aperture may define any geometric shape, such as, for example, circles, ellipses, ovals, squares, rectangles. As embodied herein, and in accordance with one aspect of the invention, the base of the container 10 is defined by a geometric shape. In a preferred embodiment of the invention, the aperture is defined by a shape which corresponds to the geometric shape of the base. For example, as embodied herein, the container and its base are rectilinear in shape with rounded corners. Accordingly, the aperture 22 is defined by a rectilinear shape having rounded corners. Designing the aperture 22 such that its shape corresponds to that of the base as shown in FIGS. 1-3 allows for an enhanced heating characteristic. However, it shall be understood that the aperture shape may differ from that of the base without departing from the spirit or scope of the invention.

Additionally, and further in accordance with another aspect of the invention, the perimeter of the aperture can be sized or tuned about an energy maxima. For example, and with reference to FIG. 3, the corners of the aperture are preferably rounded and have a radius dimension (r) 36. The perimeter of the aperture can be sized such that $P=1/4\lambda+n(1/2)\lambda=2(Y-2r)+2(X-2r)+2\pi r$, wherein n is an integer.

In sizing the aperture about an energy maxima, there is a noticeable improvement in temperature consistency, an accelerated heating of the food product, an enhanced moisture retention and an elimination or reduction of overcooked or burnt edges. The aperture dimension of the invention generally allows those waves which are at or approximate to the peak wave forms in phase to penetrate within the container. Accordingly, heating is enhanced and the microwave oven cooking characteristics of the container are significantly improved.

As depicted in FIGS. 1-4 and in accordance with a preferred embodiment of the invention, the container includes a rim 24 extending laterally from an edge of the peripheral side wall. The rim can be used for both structural and functional purposes. For example, the rim 24 can strengthen the container construction and allow for grasping during use. Preferably, the layer of microwave-reflective material 16 does not does not extend across the entire surface of the rim 24. More preferably, the microwave reflective material does not extend onto any portion of the rim. Hence, the rim is essentially formed of microwave-transparent material so as not to arc during use.

Figure 4:
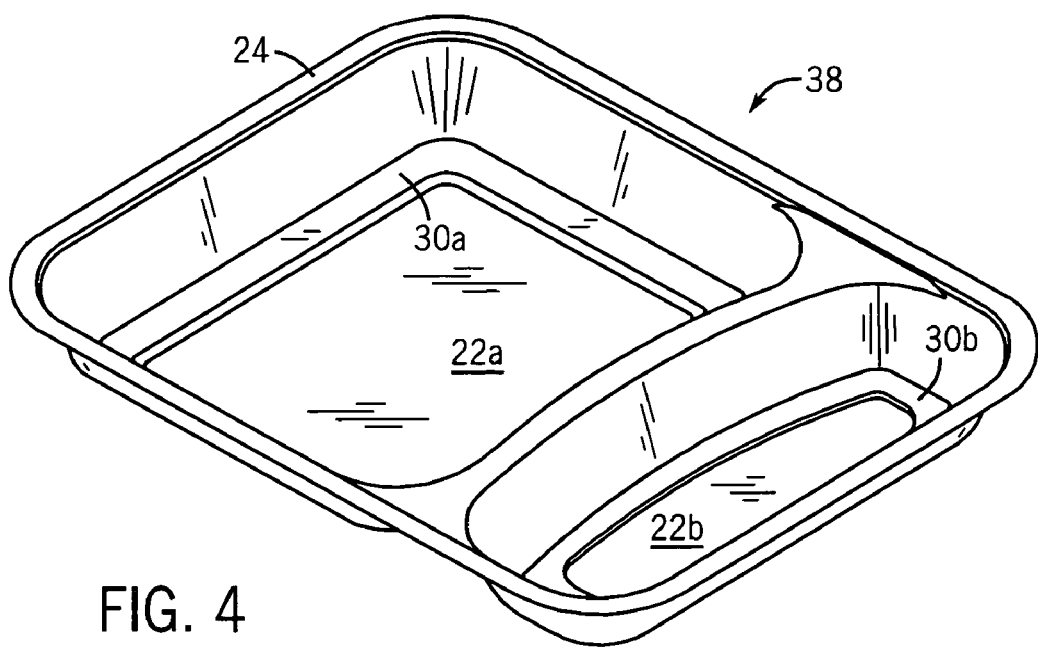
FIG. 4 is a perspective view of an alternative embodiment of the microwaveable laminate container of the present invention.

In further accordance with the invention, the specifically sized aperture technology can easily be used for multi-compartment containers. For purposes of illustration and not limitation, FIG. 4 illustrates a dual compartment tray 38 wherein each compartment has a single aperture 22a, 22b. It is understood that containers with additional compartments are within the scope of the invention. Similarly, the container can be configured such that an aperture is provided only in selected compartments of the container.

Figure 9:
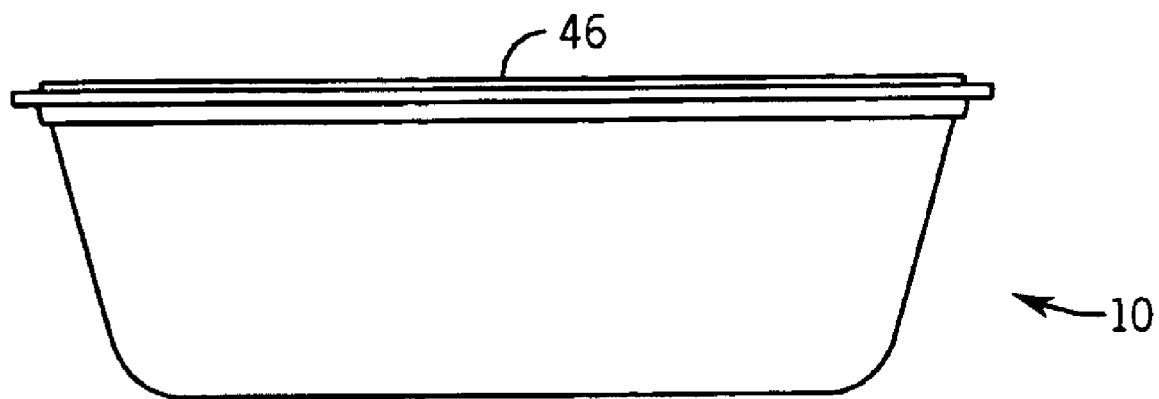
FIG. 9 is a side view of an alternative representative embodiment of the microwaveable laminate container of the present invention.
Figure 10:
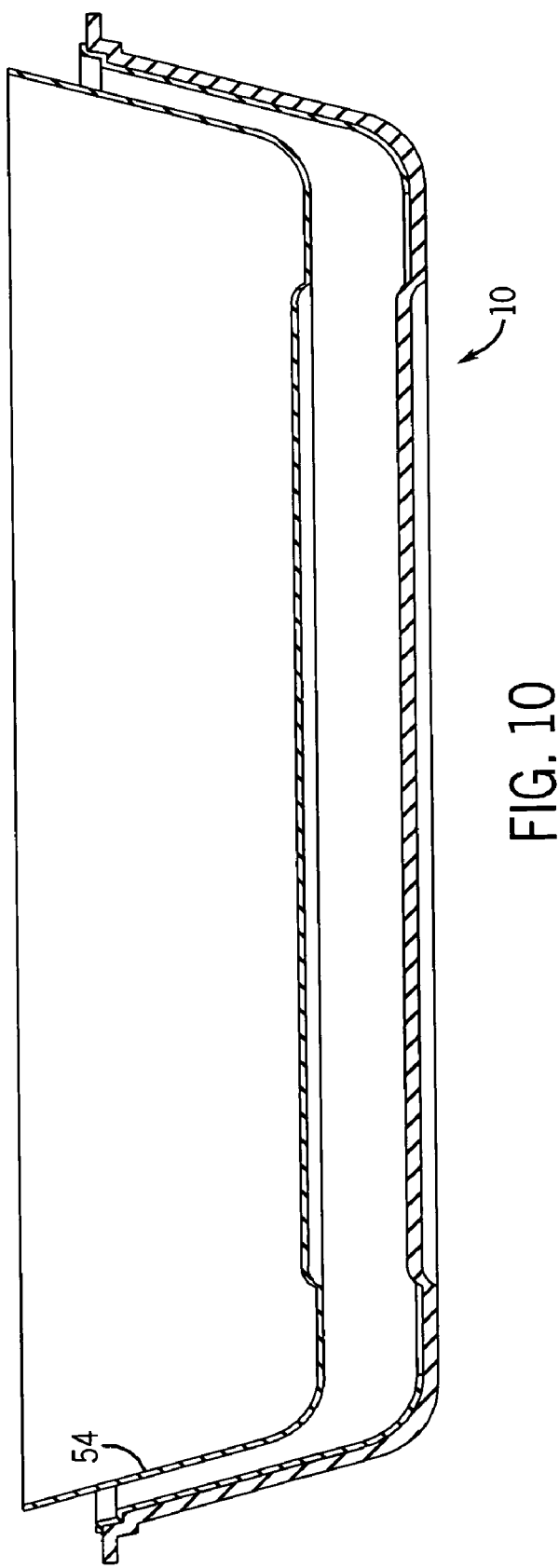
FIG. 10 is a cross-sectional view of an another representative embodiment of the microwaveable laminate container of the present invention.
Figure 13B:
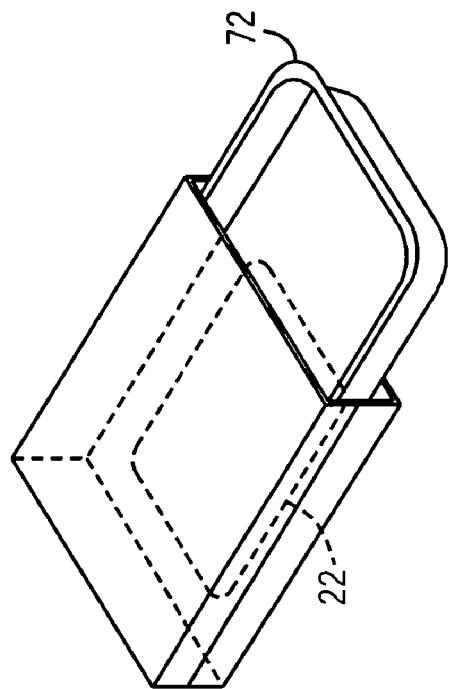
FIG. 13b is a perspective view.
Figure 13D:
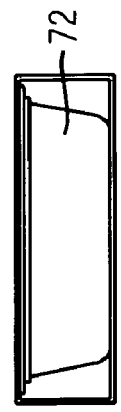
FIG. 13c is a side view and FIG. 13d is a front view of an assembly including another representative embodiment of the microwaveable foil laminate container of the present invention.
Figure 13A:
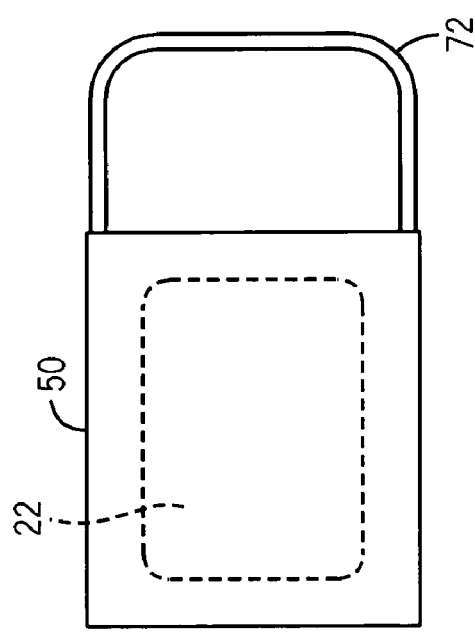
FIG. 13a is a top view.
Figure 13C:
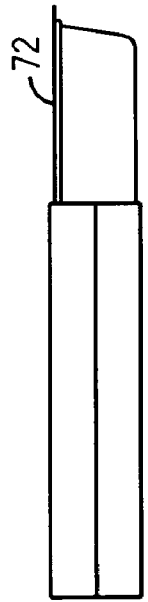

In accordance with another embodiment of the invention and as depicted in FIG. 9, the container 10 can include a lid 46 which is effective in sealing the container and the contents therein. If desired, the lid can be constructed of the laminate structure as previously described with at least one aperture defined within the microwave-reflective layer. In accordance with yet another embodiment of the invention and as depicted in FIG. 10, the tray container 10 of the present invention can be configured to easily receive a liner 54 which is inserted into the tray. Typically, the liner is configured to accommodate a variety of food products. The liner acts as a protective barrier between the food product and the laminate container 10 and also allows the container to be recycled and reused in the heating of food products placed in additional liners.

In accordance with a preferred embodiment of the invention, the container is designed to be used in a microwave oven. However, the container of the present invention will contribute to the improved heating of a food product in any apparatus that heats either totally or partially using energy in wave form, such as, for example, microwaves. This also includes combination ovens wherein two or more methods are used to convey energy for heating the food product. In addition, the container can be used for both microwave oven and conventional oven use.

Any variety of microwave-reflective materials can be used in accordance with the invention. For example, it is generally known that electrically conductive metals having a thickness above that at which a portion of the microwave radiation is converted into thermal energy become largely opaque to microwave radiation. Accordingly, electrically conductive metals of a certain thickness can act as a shield to microwave energy and thus be considered microwave-reflective materials. The aperture configured according to the present invention within the electrically conductive metal, which acts as a microwave-reflective material, functions as a guide and allows those waves incident to the length and width of the aperture to pass through in phase, thereby intensifying the heating of the food product.

The technology of the present invention can be used for any size container and accordingly can accommodate a variety of sizes and types of food products. In this manner, the aperture can be sized independent of the container. Conversely, the container size is not limited or constricted by the size of the aperture. Furthermore, the container can be configured such that the microwave-reflective material is visible to the user or it can be hidden from view, such as by one or more layers of microwave-transparent material disposed thereover. The present invention compensates for lack of consistent distribution of microwave energy currently demonstrated by conventional microwave ovens. It also compensates for the special challenges accompanied with food product shape and energy absorption characteristics.

As previously noted, the container of the invention is manufactured from a multiple layer laminate, including at least a layer of microwave-transparent material and a layer of microwave-reflective material. The microwave-transparent material is preferably paperboard. However, any microwave-transparent material capable of being formed into a packaging structure in which a food product may be heated may be used. Additional microwave-transparent materials include, but are not limited to, polyethyleneterephthalate (PET), including homopolymer and copolymer variations, polybutylenetherphthalate (PBT), polyolefins, including polyethylene, polypropylene, polystyrene and polymethylpentene, polyethylenenaphthalate and copolymer variations, acrylics, acrylates, including polyethylmethacrylate and polyethylacrylate, nylons and polyamides. In further accordance with the invention, the microwave-transparent material can also include any suitable polymer film, layer, or coating for use within microwave ovens.

As previously noted, the microwave-reflective layer can include any suitable material having a thickness sufficient to shield microwave energy. Additionally, the thickness of the microwave-reflective layer can vary depending on the manufacturing process used to form the laminate structure. In a preferred embodiment the thickness of the microwave-reflective layer is between 0.0001-0.05 inches. In a more preferred embodiment, the thickness of the microwave-reflective material is between 0.0002-0.0005. In accordance with a preferred embodiment, the microwave-reflective material is aluminum. However, any material which is capable of shielding microwave energy may be used. For example, additional microwave-reflective materials include, but are not limited to, electrically-conductive materials, copper, gold, silver, platinum, iron, carbon and alloys thereof. The layer of microwave-reflective material is preferably continuous across the layer of microwave-transparent material with the aperture defining a closed perimeter which is free of microwave-reflective material within the perimeter thereof. In accordance with one aspect of the invention, the layer of microwave-reflective material is coextensive with the layer of microwave-transparent material and extends across the entire surface of the microwave-reflective material with the exception of the area defining the aperture.

In accordance with a preferred embodiment of the invention and as depicted in FIGS. 1-2, the laminate structure can include an additional microwave-transparent layer 18 which is disposed across the surface of the layer of microwave-reflective material 16. This second microwave-transparent material, such as, for example, paperboard or any other microwave-transparent material as previously described, provides for a more durable container. Additionally, the second layer of microwave-transparent material can disguise the microwave-reflective material so as to be more aesthetically pleasing if desired. It shall be appreciated, however, that an effective container can be manufactured without utilizing a second microwave-transparent layer in accordance with the invention. The second microwave-transparent layer 18 is adjacent to the food product and, accordingly, must have a protective layer thereon. The protective layer is preferably in the form of a polymer coating 20. The polymer coating 20 is applied to the laminate structure and acts as a protective barrier between the food product and the container. In a preferred embodiment, the polymer coating is applied to the second microwave-transparent layer using conventional techniques. However, the polymer coating can also be provided directly to the microwave-reflective layer if a second layer of microwave-transparent material is not provided. Examples of suitable polymers for the polymer layer include, but are not limited to, polyethyleneterephthalate (PET), including homopolymer and copolymer variations, polybutylenetherphthalate (PBT), polyolefins, including polyethylene, polypropylene, polystyrene and polymethylpentene, polyethylenenaphthalate and copolymer variations, acrylics, acrylates, including polyethylmethacrylate and polyethylacrylate, nylons and polyamides.

For purposes of illustration and not limitation, the two microwave-transparent layers 14 and 18 can be formed from either the same material or each layer can be formed of a different microwave-reflective material. For example, in accordance with one aspect of the invention, the microwave-transparent material disposed at the base of the container can be formed of a material having a greater rigidity to support the food product.

Figure 5A:
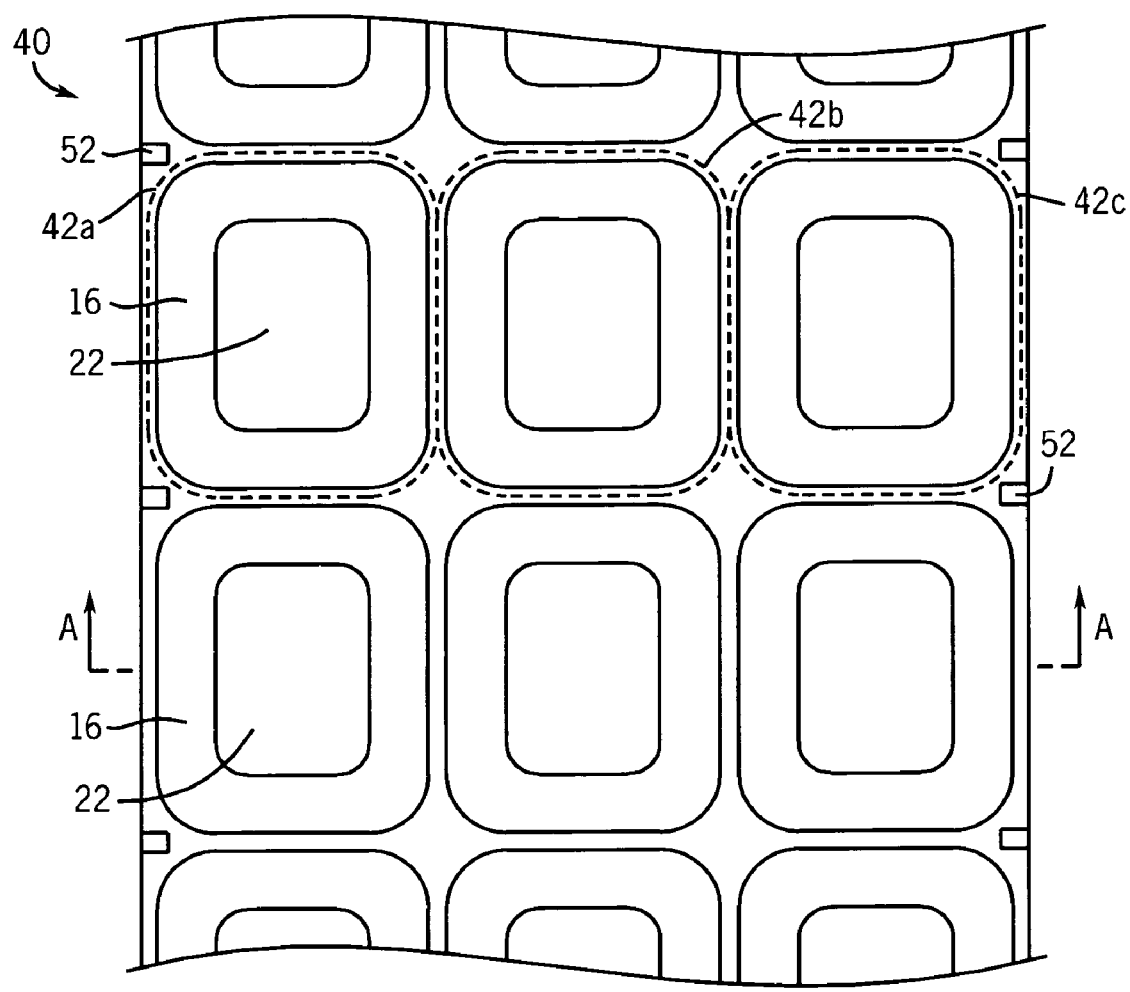
FIG. 5a is a top view and FIG. 5b is a cross-sectional side view of a first representative embodiment of the laminate web used to manufacture the microwaveable laminate container of the present invention.
Figure 5B:
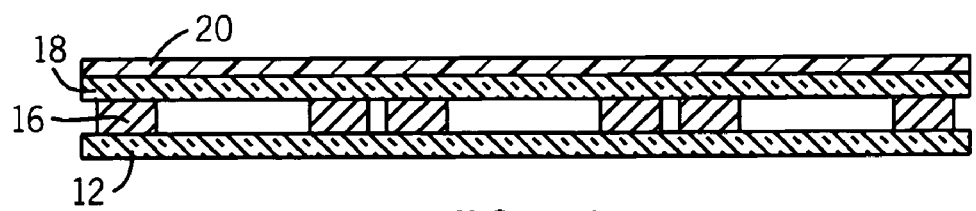
Figure 6A:
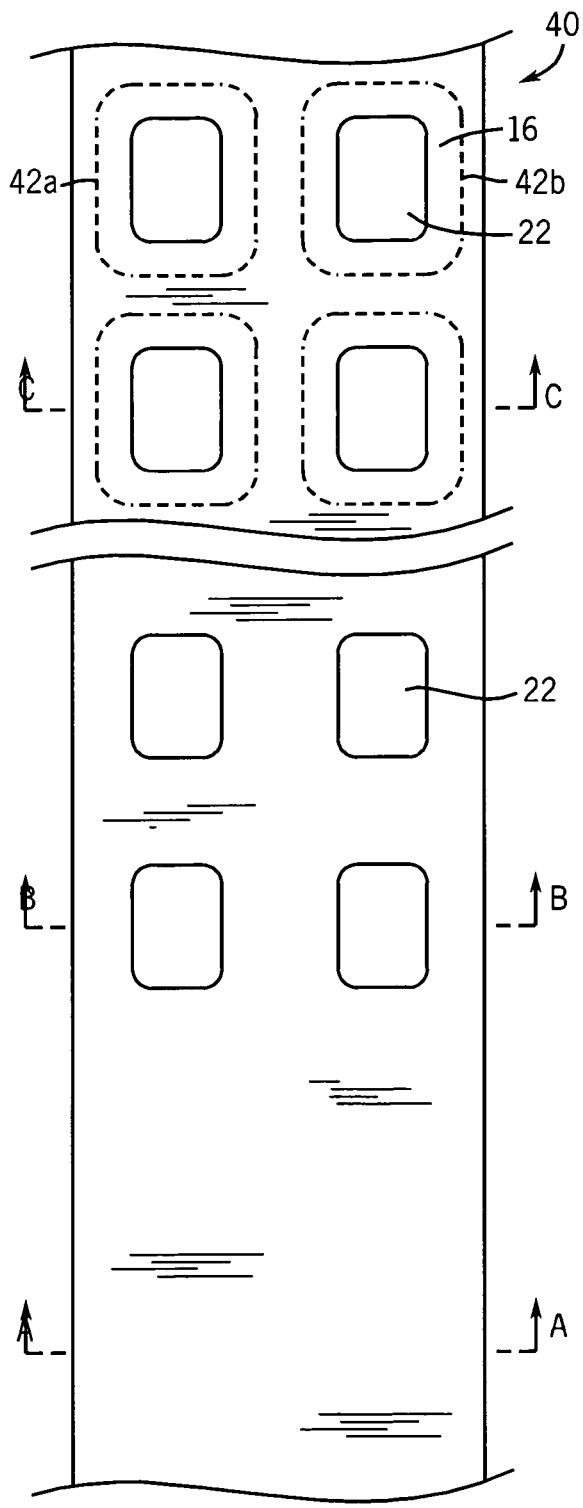
FIG. 6a is a top view and FIG. 6b, FIG. 6c and FIG. 6d are cross-sectional side views of an alternative representative embodiment of the laminate web used to manufacture the microwaveable laminate container of the present invention.
Figure 6D:
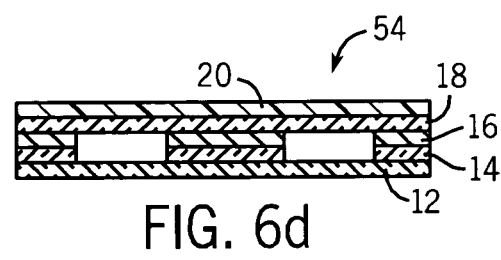
Figure 6C:
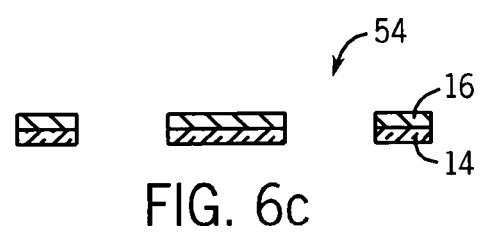
Figure 6B:
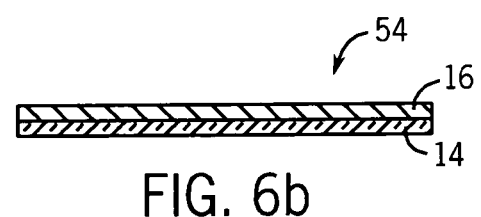

Exemplary embodiments of alternative laminate construction are illustrated in FIGS. 5b and 6b. In accordance with one embodiment of the invention, the container is manufactured from the laminate construction depicted in FIG. 5b. As embodied herein, and in accordance with one aspect of the invention, the laminate web 40 of FIG. 5b is comprised of at least four layers including, a microwave-transparent layer 12, a microwave-reflective layer 16, a second microwave-transparent layer 18 and a polymer coating 20. As previously noted, the polymer coating is disposed on the second microwave-transparent layer 18 to substantially form a barrier between the food product and the container.

In further accordance with an exemplary embodiment of the invention and as depicted in FIG. 6b, the laminate structure includes a substrate 14 for the microwave-reflective material 16 as described with regard to the first embodiment of FIGS. 1-3. In certain manufacturing methods, it is preferred that the microwave-reflective material 16 is initially bonded to a substrate 14. Preferably, the substrate 14 is a microwave-transparent material that includes but is not limited to paperboard, plastics, polyethyleneterephthalate (PET), including homopolymer and copolymer variations, polybutylenetherphthalate (PBT), polyolefins, acrylics, acrylates, nylons, polyamides and molded fibers. The substrate 14 is preferably substantially thinner than the other microwave-reflective layers of the laminate, such as, for example the first paperboard layer 12 and the second paperboard layer 18. The substrate provides the microwave-reflective material 16 with substantial durability and rigidity which may be required to process the microwave-reflective material during manufacture. The substrate 14 is bonded to the microwave-reflective material 16 in a conventional manner, such as by adhesives or the like, and this substrate-microwave reflective laminate structure 54 is further processed to form a laminate web.

The layers of the laminate are preferably adhered to each other by an intermediate layer of resin or adhesive dispersed between the various layers. It shall be understood that any suitable adhesive system may be used in the present invention such as, for example, wet bond adhesive, dry bond pressure sensitive, dry bond heat activated and extrudable adhesives. In accordance with a preferred embodiment of the invention, a wet bond adhesive system is used to effectively bond all layers of the laminate structure. An example of a wet bond adhesive system includes water based modified acrylic adhesives.

As embodied herein, and as depicted in FIGS. 5-8, the laminate web 40 is an intermediate article of manufacture which is ultimately formed into a container or packaging structure. Accordingly, a food product or the like may be maintained in the same structure through the steps of filling, freezing, storing, shipping, retailing and reconstitution for consumption.

Various methods can be employed to manufacture the microwaveable container of the present invention. In accordance with the invention, the method includes providing a first layer of microwave-transparent material, providing a second layer of microwave-reflective material, and defining at least one aperture within the second layer, wherein the aperture is sized about an energy maxima. The aperture is sized about an energy maxima by sizing at least the width dimension or the length dimension within $\frac{1}{8}\lambda$ of a predetermined dimension D equal to $\frac{1}{4}\lambda + n(\frac{1}{2})\lambda$, as previously described. The method of the invention further includes combining the first layer of microwave-transparent material and the second layer of microwave-reflective material to define a laminate member and forming the laminate member into a container having a base and a side wall. If desired, additional layers can be provided, such as a substrate layer 14 for the microwave-reflective material and one or more additional layers of microwave-transparent material 18. A variety of methods can be employed to manufacture such a laminate structure used in producing the container of the present invention, wherein an aperture or opening is defined in the layer of microwave-reflective material that is combined with the layer of microwave-transparent material. Such laminating methods are generally known by those skilled in the art and include, but are not limited to, die-cut, kiss-cut, laced array, chemical etch and any combination thereof. Various methods for forming the laminate structure are described herein. While the methods of manufacturing the laminate structure generally refer to the microwave-transparent layer as the paperboard layer and the microwave-reflective material as the aluminum layer it shall be appreciated by those skilled in the art that these are exemplary embodiments and that other materials can be used as described herein without departing from the spirit or scope of the invention.

Figure 14:
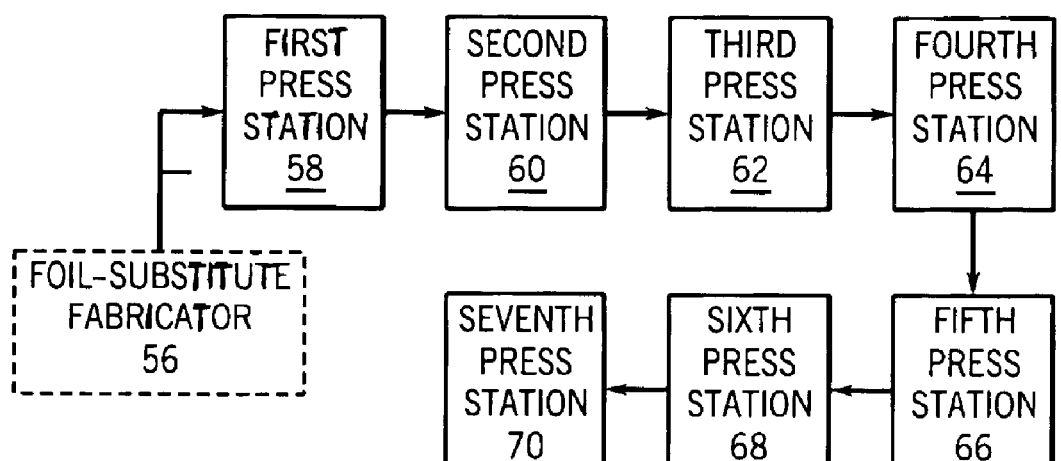
FIG. 14 illustrates the method of shaping the laminate web into the container of the present invention.

In accordance with one embodiment of the invention, the laminate structure is manufactured via what is known as a kiss-cut manufacturing method. Referring to FIGS. 5a, 5b and 14 by way of example only, a full web of aluminum foil 16 and paperboard layers 12, 18 are unwound and pulled through a laminating press. At a first press station 58, a pattern of adhesive is applied to the first paperboard layer 12 which will receive the foil. This pattern is substantially the same as the desired pattern for the foil required for the container, which can be rendered by flexographic or gravure techniques, as is known in the art. The pattern's dimension, shape, and location correspond to the foil pattern to be rendered, less a small offset relief if desired or necessary. The offset relief of the adhesive pattern limits adhesive spreading into inappropriate areas. The additional paperboard layer 18 is pulled through the laminating press for processing further down stream. At a second press station 60, the full web width of foil is combined, under the pressure of nipping or squeezing rollers, such that it is bonded to the patterned adhesive coated areas of the targeted paperboard 12. At a third press station 62, a cutting procedure of essentially only the laminated foil layer is performed (e.g., kiss-cut). This procedure occurs in complete register with and to the same dimensions, shape, and location as the patterned adhesive areas. At a fourth press station 64, non-adhered foil is removed. The non-adhered foil is preferably removed pneumatically such as, via vacuum or blowers, which can be assisted by blade or brush wiping assemblies. At a fifth press station 66, a full web coating of adhesive is applied to a second paperboard layer 18. The surface of the second paperboard layer 18, which is to be fixed to the foil side of the laminate, will receive the adhesive coating. At a sixth press station 68, under the pressure of nipping or squeezing rollers, the patterned-foil-paperboard laminate and the second paperboard layer 18 are combined. If desired, a layer of polymer 20 can be applied to the second paperboard layer 18, either prior to the sixth press station 68, or after the second paperboard layer has been combined with the patterned-foil-paperboard laminate. At a seventh press station 70, heat treatment of the combined materials will be performed. This may be necessary in order to drive off moisture, fuse the resinous portion of the adhesive within itself and to the paperboard and effect flow of the resinous film into the porous surface of the paperboard. After the seventh press station there can be, if necessary or desired, a chill roll system for reducing the temperature of the finished laminate in preparation for rewinding. Accordingly, the final step in this series of operations includes rewinding the completed laminate into a roll if desired. Alternatively, the laminate can then be shaped into the desired containers, as described in further detail below, without the need to wind the laminate into a roll. As embodied herein and as depicted in FIG. 5a, the laminate 40 defines blanks 42a, 42b, 42c which will be shaped into containers as described in further detail below. For purposes of illustration and not limitation, the blanks depicted in FIG. 5A include an aperture 22, a rectangular-area of microwave-reflective material 16 and a border of microwave-transparent material 18, 20 surrounding the rectangular-area of microwave-reflective material 16. The equipment required to perform the described function or process at each press station is well known and commercially available.

In accordance with an alternative embodiment of the invention, the laminate structure is manufactured via a die-cut full web manufacturing process. Referring by way of example only to FIGS. 6a, 6b, 6c, 6d and 14, the microwave-reflective material 16, which is a continuous web of aluminum foil, is adhesively laminated to a substrate layer 14 such as paperboard. The laminating of the aluminum layer and the substrate layer can be accomplished as a separate operation 56 from the sequence of events that are detailed below. Preferably, the substrate-aluminum foil laminate 54 is manufactured by unwinding the foil 14 and substrate layers 16; applying a full web coating of adhesive to the substrate surface on which the foil will be bonded; combining the foil and substrate layers under the pressure of nipping or squeezing rollers, such that the foil is in contact with the adhesive coated surface of the paper; and heat-treating the combined material, as necessary, to drive off moisture, fuse the resinous portion of the adhesive to itself and the substrate, and effect flow of this resinous film into the porous surface of the substrate. Subsequent to the manufacture of the foil-substrate laminate 54, the full web aluminum foil-substrate laminate 54 and the paperboard layers 12,18 are unwound and pulled through a laminating press. At a first press station 58', a full web coating of adhesive is applied to the paperboard 12, which will receive the foil-substrate laminate 54. The second paperboard layer 18 is pulled through the laminating press, so as to be processed further downstream. Referring to FIG. 6A, at a second press station 60', the foil-substrate laminate 54 is die-cut in the desired pattern for both functionality within the final product and for web continuity as it is pulled through the laminator. For purposes of illustration and not limitation, FIG. 6A illustrates a single rectangular-shaped aperture 22, die-cut from the foil-substrate laminate 54 for each container to be formed. Additional openings may also be die-cut from the foil-substrate laminate to remove excess areas of microwave-reflective material along the edge boundary of each blank 42a, 42b that will be shaped into a container, without comprising laminate web continuity. For example, strip-like openings can be formed along the edges, and cross or diamond shaped openings can be formed at the corners between adjacent blanks. The cutting of the foil-substrate laminate can be performed, for example, by rotary or flat platen die-cutting assemblies. At a third press station 62', under the pressure of nipping or squeezing rollers, the foil-substrate laminate 54 and one of the paperboard layers 12 are combined using a resin, adhesive system or the like. At a fourth press station 64', a full web coating of adhesive is applied to the second paperboard layer 18. The surface of the second paperboard layer 18 which is to be fixed to the foil side of the laminate will receive the adhesive coating. At a fifth press station 66', under the pressure of nipping or squeezing rollers, the foil-substrate-paperboard laminate and the second paperboard layer 18 are combined. If desired, a layer of polymer 20 can be applied to the second paperboard layer 18, either prior to the fifth press station 66', or after the second paperboard layer has been combined with the foil-substrate-paperboard laminate. At a sixth press station 68', an effective heat treatment of the combined materials may be performed. The heat treatment can, if necessary, drive off moisture, fuse the resinous portion of the adhesive within itself and to the paperboard and, effect some flow of this resinous film into the porous surface of the paperboard. After the sixth press station there can be, if determined to be necessary, a chill roll system for reducing the temperature of the finished laminate in preparation for rewinding as described above. Alternatively, the laminate can then be shaped into the desired containers, as described in further detail below, without the need to wind the laminate into a roll. As embodied herein and as depicted in FIG. 6a, the laminate 40 defines blanks 42a, 42b which will be shaped into containers as described in further detail below. For purposes of illustration and not limitation, the blanks 42a, 42b that are produced via the die-cut full web manufacturing process and as depicted in FIG. 5A include an aperture 22 and a rectangular-area of microwave-reflective material 16. The equipment required to perform the described function or process at each press station is well known and commercially available through a variety of sources, such as Inta-roto, Inc. and Rotometrics.

In accordance with an alternative preferred embodiment of the invention and referring to FIGS. 7a, 7b, 7c, 7d and 14, the laminate structure is manufactured via a laced array intermediate. Referring to FIG. 7A by way of example only, in this process, one or more separate strips 16a, 16b of otherwise continuous aluminum foil per product stream are adhesively laminated to a full web width layer of substrate 14. The distance between each strip of continuous aluminum foil will correspond with the tray forming stream separation. The formation of the substrate-aluminum laminate 56 can be formed either separate to or in conjunction with the balance of the process described hereafter. The substrate-aluminum laminate 54 can be formed by unwinding the parallel strips of foil membranes positioned coincident with the product streams; unwinding, in parallel with the foil strips, the full width paper web which will serve as the base substrate; applying a coating of adhesive to the substrate surface only in those areas where the foil strip will be bonded; combining the foil strips and paper membrane under the pressure of nipping or squeezing rollers, such that the foil strips are in contact with the adhesive coated surface of the substrate; heat treating the combined material as may be necessary in order to drive off moisture, fusing the resinous portion of the adhesive within itself and the substrate, and effecting the flow of this resinous film into the porous surface of the substrate. Subsequently, the foil-substrate laminate and the two additional paperboard layers are unwound and pulled through the laminating press. At the first press station 58', a full web coating of adhesive is applied to the paperboard which will receive the foil-substrate laminate 54. The other paperboard layer is pulled through the laminating press for processing further down stream. Referring to FIG. 7A, at a second press station 60', the foil-substrate laminate 54 is die-cut in the desired pattern for both functionality within the final product and for web continuity as it is pulled through the laminator. For purposes of illustration and not limitation, FIG. 7A illustrates that a rectangular-shaped aperture 22 and two hour-glass shaped openings 74 are die-cut from the foil-substrate laminate 54 to define each blank to be formed into a container; wherein adjacent blanks in the machine direction can share an hour-glass shaped opening. The rectangular aperture 22 defines the interior aperture and the hour-glass apertures 74, which act as separators, remove the excess microwave-reflective material at each lateral edge of the blanks 42a, 42b to be formed or shaped into the containers of the present invention. At a third press station 62', under the pressure of nipping or squeezing rollers, the foil-substrate laminate and one of the paperboard layers 12 are combined. At a fourth press station 64', a full web coating of adhesive is applied to the second paperboard layer 18. The surface of the second paperboard layer which is to be fixed to the foil-paper substrate paperboard side of the laminate will receive the adhesive coating. At a fifth press station 66', under the pressure of nipping or squeezing rollers, the foil-substrate-array-paperboard laminate and the second paperboard layer 18 are combined. If desired, a layer of polymer 20 can be applied to the second paperboard layer 18, either prior to the fifth press station 66', or after the second paperboard layer has been combined with the foil-substrate-array-paperboard laminate. At a sixth press station 68', heat treatment of the combined materials is accomplished, if necessary. This heat treatment step may be necessary to, drive off moisture, fuse the resinous portion of the adhesive within itself and to the paperboard and, effect flow of this resinous film into the porous surface of the paperboard. After the sixth press station there can be, if necessary or desired, a chill roll system for reducing the temperature of the finished laminate in preparation for rewinding. Accordingly, the final step in this series of operations includes rewinding the completed laminate into a roll if desired. Alternatively, the laminate can then be shaped into the desired containers, as described in further detail below, without the need to wind the laminate into a roll. For purposes of illustration, the blanks 42a, 42b that are produced via a laced array manufacturing process and as depicted in FIG. 7A include an aperture 22, a rectangular-area of microwave-reflective material 16 and a border of microwave-transparent material surrounding the rectangular-area of microwave-reflective material. The equipment required to perform the described function or process at each press station is well known and commercially available through a variety of sources, such as Inta-roto, Inc. and Rotometrics.

Figure 8A:
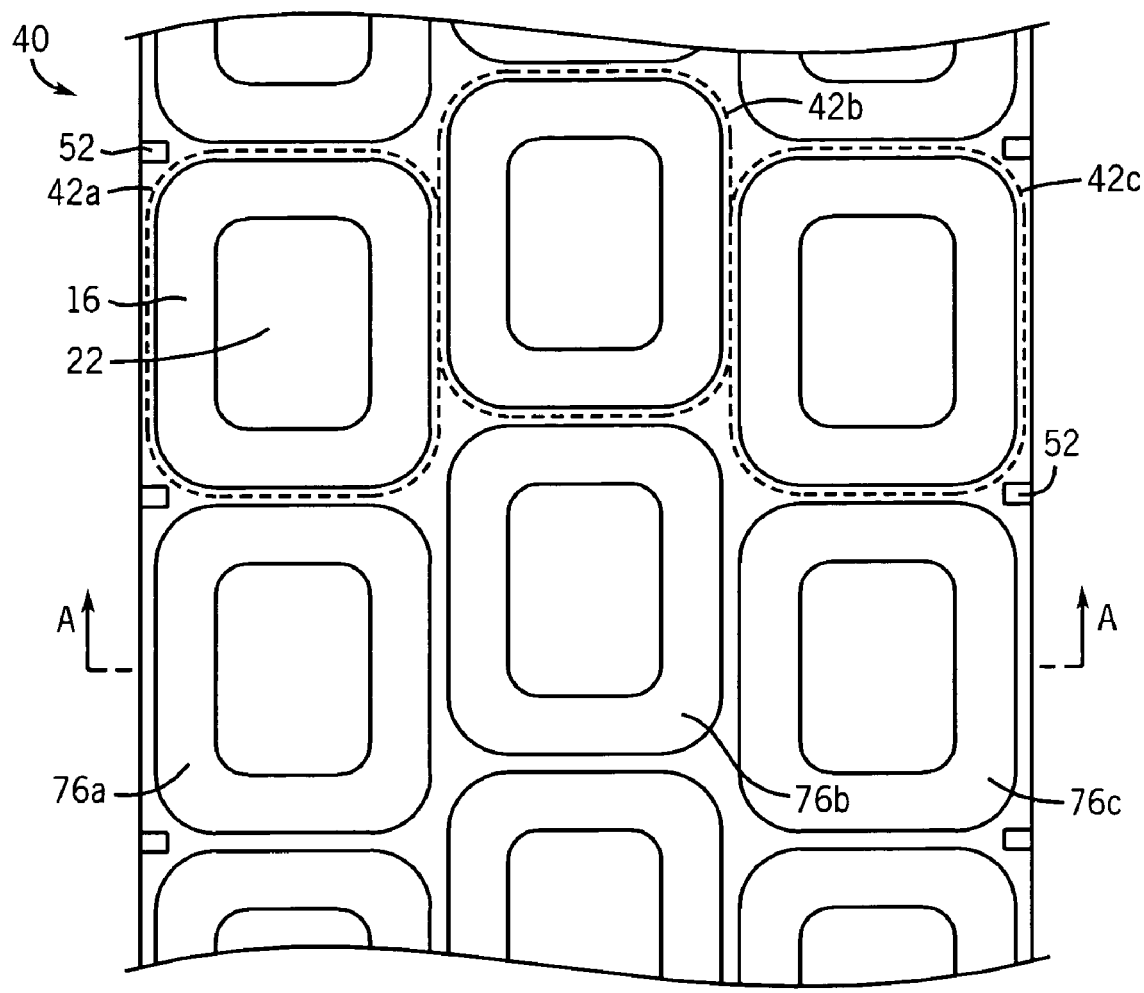
FIG. 8a is a top view and FIG. 8b is a cross-sectional side view of an alternative representative embodiment of the laminate web used to manufacture the microwaveable laminate container of the present invention.
Figure 8B:
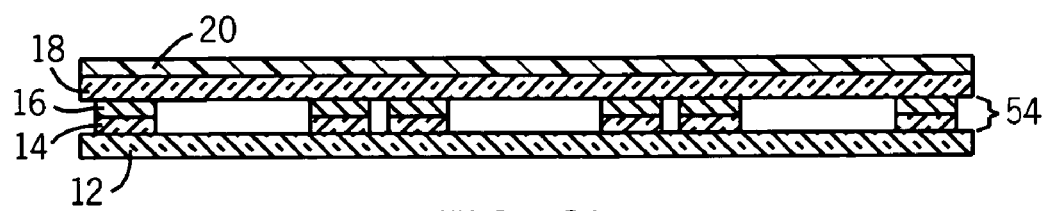

In accordance with yet an alternative embodiment of the invention, the laminate structure is manufactured via a laminate of cut and placed foil patches. Referring by way of example only to FIGS. 8a, 8b and 14, the microwave-reflective material, which is a continuous web of aluminum foil, is adhesive laminated to a substrate layer. The laminating of the aluminum layer and the substrate layer can be accomplished as a separate operation 56' from the sequence of events that are detailed below. Preferably, the substrate-aluminum foil laminate is manufactured by unwinding the foil and paper membranes, applying a full web coating of adhesive to the substrate surface on which the foil will be bonded, combining the foil and paper membranes under the pressure of nipping or squeezing rollers, such that the foil is in contact with the adhesive coated surface of the paper, and heat treating the combined material as may be necessary in order to drive off moisture, fuse the resinous portion of the adhesive to itself and the substrate, and effect flow of this resinous film into the porous surface of the substrate. Subsequent to the manufacture of the foil-substrate laminate 54, the laminate 54 and the paperboard layers 12, 18 to be used are unwound and pulled through the laminating press. Referring by way of example to FIG. 8A, at a first press station 58', the foil-substrate laminate 54 is die-cut in the desired pattern as determined for final product functionality to form foil-substrate patches or labels. The shape of each foil-substrate label generally corresponds to the desired shape of the container. For purposes of illustration and not limitation, FIG. 8a illustrates three patches 76a, 76b or 76c that are rectangular in shape with an opening or aperture in the center. Adhesive is then applied to the paper side of the die-cut foil-substrate patches, and the patches are transferred and applied to one of the paperboard layers 12. Placement and deposition of each patch is performed accurately, such as, for example, by robotics, machine-vision technology, controlled interval repeats, or vacuum transfer techniques, so as to correspond in terms of web position with its subsequent location in the resultant tray. The second paperboard layer 18 is pulled through the laminating press for processing further down stream. At a second press station 60', the second paperboard layer, to be attached to the foil-substrate patch paperboard laminate, receives a full web application of adhesive. At a third press station 62', under the pressure of nipping or squeezing rollers, the second layer of paperboard and the foil-substrate patch paperboard laminate are combined. If desired, a layer of polymer 20 can be applied to the second paperboard layer 18, either prior to the third press station 62', or after the second paperboard layer has been combined with the foil-substrate patch paperboard laminate. At a fourth press station 64', heat treatment of the combined materials is accomplished. The heat treatment can, if necessary to drive off moisture, fuse the resinous portion of the adhesive within itself and to the paperboard and effect flow of this resinous film into the porous surface of the paperboard. After the fourth press station there can be, if determined to be necessary, a chill roll system for reducing the temperature of the finished laminate in preparation for rewinding as described above. Alternatively, the laminate can then be shaped into the desired containers, as described in further detail below, without the need to wind the laminate into a roll. For purposes of illustration, the blanks 42a, 42b, 42c that are produced via a cut and placed foil patches manufacturing process and as depicted in FIG. 8a include an aperture 22, a rectangular-area of microwave-reflective material 16 and a border of microwave-transparent material surrounding the rectangular-area of microwave-reflective material. The equipment required to perform the described function or process at each press station is well known and commercially available through a variety of sources, such as Tamarack Products, Inc.

Once the desired layers are combined to form a laminate web member 40, it can then be formed into a finished product or container. As embodied herein and as depicted in FIGS. 5a, 6a, 7a and 8a, the laminate web 40 includes blanks 42a, 42b, 42c, each of which will correspond to a number of containers. For purposes of illustration and not limitation, FIGS. 5a and 8a illustrate a laminate web having three blanks in the transverse direction and FIGS. 6a and 7a illustrate a laminate web having two blanks in the transverse direction. However, it shall be understood that these are exemplary and any number of blanks can be included across the width or transverse direction of the web 40. Furthermore, the blanks 42a, 42b and 42c for the container may be aligned with each other across the web as illustrated in FIGS. 5a, 6a, 7a or staggered as illustrated in FIG. 8a. Preferably, the laminate web also includes timing marks 52 which are used when configuring the web into individual containers. To form the laminate member into the desired container, moistening of the laminate is necessary in order to make the web pliable. This moistening step can be accomplished by techniques that include, but are not limited to, passing the web through a bath of water, passing the web through an array of water spray jets, applying the water via direct gravure coating equipment, or applying water via reverse roll coater equipment. Additionally, printing of the appropriate laminate surface(s) can further enhance the appeal of the container for commercialization, for aesthetics, such as for use as a serving utensil, or for furnishing use instructions or the like. Printing can be accomplished by a number of techniques that include, but are not limited to, flexographic printing, gravure printing or ink jet printing.

Generally, the step of forming the container of the present invention will convert the flat laminate web 40 into an erect container 10 for holding food products or the like. This process can include web scoring impressions made at strategic locations for controlled folding; blank cutting, which determines the perimeter size and shape for the container to be formed; and shaping via dies which can include a punch, cavity, and pressure-ring for laminate flow control during the drawing stroke of the machine or vacuum drawing techniques. These processes can be confined as the internal works of one machine or they can be individually assigned to separate machines which are well known and commercially available in the art. After forming, the trays can be packaged for commercial distribution. Other processes for forming the container of the present invention include, but are not necessarily limited to, formed and corner glued configuration, as is known in the art, such as to form trays, boxes, or sleeves.

Figure 11:
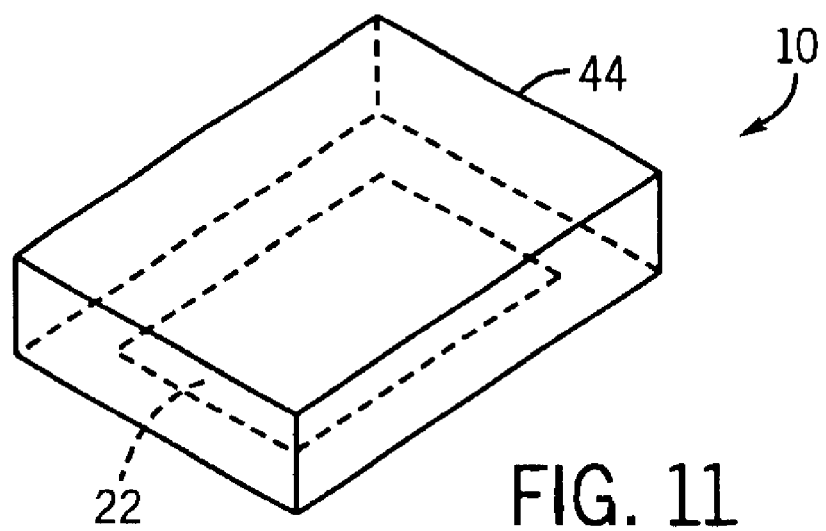
FIG. 11 is a perspective view of an another representative embodiment of the microwaveable laminate container of the present invention.

As embodied herein and as depicted in FIGS. 1-10, the container of the present invention is illustrated as a tray useful for the microwave cooking of prepared food products. However, the container of the present invention can be fashioned into any number of receptacle types. For purposes of illustration and not limitation, several types of containers that can be fashioned from the laminate structure of the present invention are depicted in FIGS. 11-13. In accordance with one embodiment of the invention and as depicted in FIG. 11, the container may be fashioned as a carton or box 44. The carton or box 44 is formed of a laminate member including at least a layer of microwave-transparent material and a layer of microwave-reflective material with at least one aperture defined within the microwave-reflective material as previously described. In further accordance with the invention and as depicted in FIGS. 12a-12d, the laminate structure can be formed into a box 48 having a microwave-reflective layer which has at least one aperture 22 therein. The box is constructed such that a tray 72 formed of microwave-transparent material can be easily enclosed therein. Alternatively, as illustrated in FIGS. 13a-13d, the laminate structure is configured into a sleeve 50 having a microwave-reflective layer which has at least one aperture therein. The sleeve is designed such that it can easily receive a container 72 that is preferably formed of microwave-transparent material. In a preferred embodiment of the invention, the box 48 and sleeve 50 are configured such that they can be recycled and reused in the heating/reheating of food products in additional trays 72.

EXAMPLES

The following examples as set forth herein are provided to illustrate and exemplify the various aspects of the present invention and do not limit the invention in any way.

Example 1

Several containers formed from a laminate structure including a layer of microwave-reflective material, having an aperture defined therein, were evaluated. The aperture dimensions of the containers were varied and the results analyzed for purpose of comparison and evaluation, as well as for proof of the invention as defined herein.

The containers used in the example were fabricated from a laminate structure similar to that of FIG. 1. The laminate member of the selected containers includes a first layer of microwave-transparent material, a substrate layer, a continuous layer of microwave-reflective material having an aperture therein, a second layer of microwave-transparent material or paperboard and a protective polymer layer. The containers were fabricated from a layer of uncoated paperboard, a paper substrate layer having a thickness of 0.0025", a layer of aluminum foil having a thickness of 0.0003" and having an aperture therein, a second paperboard layer and a protective layer of black polyethyleneterephthalate. The control container was a standard non-foiled lined polyethyleneterephthalate (PET) tray and is referred to herein as CPET. The length, width and perimeter dimensions of the aperture for each container was varied. Each container was formed as a tray of substantially the same dimensions and was filled with a 77.8 fluid ounce food product. The dimensions of the containers included: a top outside length of 11", a bottom outside length of 9 1/32", a top outside width of 8 3/4", a bottom outside width of 6 7/8", and a vertical depth of 2 1/32". Each filled container was frozen and then reheated in a 1000 Watt conventional microwave oven operating at a frequency of 2.45 GHz for 21 minutes at full (100%) power. Immediately after the 21 minute cook time, a temperature profile and the mass of the food product load were measured and recorded.

Tables 1 and 2 tabulate the data and analysis for the experiments detailed herein. The tabulated data is identical, however, the data in Table 1 is sorted based on minimum temperature and the data in Table 2 is sorted based on temperature range of the food product after 21 minutes of cook time. Each container is identified by an alphanumeric character A-S and represents a container having a layer of microwave-reflective aluminum foil with a specifically sized aperture. The trays are rectangular trays having rounded corners and accordingly the apertures are also rectilinear having rounded corners. For each pattern there are four parameters L, W, r and P, corresponding to the length, width, corner radius and perimeter of the aperture, respectively.

The temperature data was summarized as mean, range, maximum and minimum food temperatures recorded after 21 minutes of microwave oven heating. The average temperature ranged from 200-144° F., the minimum temperature ranged from 181-57° F. and the temperature range spanned from 31-142° F. The aperture dimensions were correlated to a portion of the wavelength and the deviation from the energy maximum in terms of wavelength was determined for each aperture dimension. Energy maximums occur at every other quarter wavelength interval. Accordingly, the deviation from an energy maxima for the length and width aperture dimensions are defined as Del L and Del W, respectively. The sum of the deviations from an energy maxima for both the length and width aperture dimensions is defined as Sum del. Thus, Sum del is a summation of Del L and Del W. For example, for the container having a foil pattern G, the length and width dimensions were sized at the energy maxima. Thus, for a frequency of 2.45 GHz, the resulting wavelength is 4.82 inches. Sizing the width dimension (n=2, $\lambda$=4.82 inches) equal to the predetermined dimension D, thus equivalent to an energy maxima, results in a width dimension of 6.020 inches. Similarly, sizing the length dimension (n=3, $\lambda$=4.82 inches) equal to the predetermined dimension D results in a length dimension of 8.43 inches. An aperture width dimension of 6.02 inches and an aperture length dimension of 8.43 inches corresponds to 0.25 and 0.75 portions of the wavelength. An energy maximum occurs at both 0.25 and 0.75 portions of the wavelength. Thus, the deviation from the energy maxima for the aperture of foil pattern G is 0 for both the length and width dimensions.

As illustrated in Table 1, the patterns whose aperture dimensions were sized about an energy maximum, i.e. whose deviation as measured by Del L and Del W was as close to zero as possible, were most effective in achieving an acceptable minimum temperature. Accordingly, with a cook time of 21 minutes at, heating was accelerated significantly by use of a laminate container having a microwave-reflective layer with an aperture defined therein, the aperture having at least on dimension sized as within $1/8\lambda$ of predetermined dimension D equal to $1/4\lambda+n(1/2)\lambda$, as compared to the standard non-foiled lined CPET tray and those containers whose apertures deviated substantially from the energy maxima. For those containers whose aperture dimensions deviated substantially from an energy maxima, such as, for example, patterns D, E and J, the minimum internal temperature achieved at a cook time of 21 minutes was only 129, 128 and 112° F., respectively which is considered unacceptable. Typically, as an industry standard a minimum food product internal temperature of 150-170° F. is considered acceptable. By comparison, the containers having aperture dimensions within ⅛λ of the energy maxima or predetermined dimension, such as, for example, patterns R, I, F and P reached a minimum internal temperature of 181, 180, 172 and 170, respectively after a cook time of 21 minutes. In addition, as illustrated in Table 1, sizing both the length and width dimensions about an energy maxima, as indicated by Sum del having a value as close to zero as possible, provides for a more improved heating uniformity and an even faster cooking time as compared to sizing only one dimension within ⅛λ of the energy maximum.

trated in Table 2, the patterns whose aperture dimensions were sized about energy maxima were most effective in achieving a more uniform temperature profile. For those containers whose apertures deviated substantially from an energy maxima, such as, for example, patterns D, E and J, the temperature range achieved at a cook time of 21 minutes was 65, 75 and 96° F., respectively which is typically considered undesirable. By comparison, the containers having aperture dimensions within ⅛λ of the energy maxima or predetermined dimension, such as, for example, patterns I, R, N and F achieved temperature ranges after 21 minutes of cook time of

TABLE 1

Data and analysis sorted according to the minimum internal temperature of the food product

| Aperture Pattern | Temp. (° F.) | | | | Weight Loss | Aperture Dimension (inches) | | | | | | |
|---|---|---|---|---|---|---|---|---|---|---|---|---|
| | Mean | Range | Max | Min | | L | W | r | P | Del L | Del W | Sum del |
| Pattern R | 200 | 31 | 212 | 181 | 2.9% | 8.40 | 6.00 | 0.70 | 27.60 | 0.006 | 0.004 | 0.013 |
| Pattern N | 199 | 33 | 214 | 181 | 1.7% | 8.43 | 6.32 | 0.70 | 28.29 | 0.000 | 0.062 | 0.062 |
| Pattern I | 196 | 28 | 208 | 180 | 2.7% | 8.73 | 6.02 | 0.70 | 28.30 | 0.063 | 0.000 | 0.091 |
| Pattern G | 195 | 31 | 206 | 175 | 4.1% | 8.43 | 6.02 | 1.05 | 27.09 | 0.000 | 0.000 | 0.000 |
| Pattern F | 189 | 37 | 209 | 172 | 3.4% | 8.43 | 5.72 | 1.05 | 26.49 | 0.000 | 0.063 | 0.063 |
| Pattern H | 191 | 38 | 207 | 170 | 1.0% | 8.43 | 5.42 | 1.05 | 25.89 | 0.000 | 0.125 | 0.125 |
| Pattern P | 194 | 39 | 209 | 170 | 1.7 | 8.40 | 6.00 | 0.13 | 28.59 | 0.005 | 0.005 | 0.012 |
| Pattern A | 181 | 29 | 199 | 170 | 3.9% | 8.43 | 6.02 | 0.70 | 27.70 | 0.000 | 0.000 | 0.000 |
| Pattern C | 190 | 37 | 205 | 169 | 2.4% | 8.13 | 5.72 | 1.58 | 24.98 | 0.063 | 0.063 | 0.153 |
| Pattern K | 198 | 56 | 219 | 163 | 1.8% | 8.13 | 6.32 | 0.70 | 27.69 | 0.062 | 0.063 | 0.153 |
| Pattern M | 187 | 55 | 217 | 162 | 1.9% | 8.13 | 6.02 | 0.70 | 27.09 | 0.062 | 0.000 | 0.090 |
| Pattern L | 190 | 44 | 203 | 159 | 2.5% | 8.58 | 5.72 | 0.70 | 27.39 | 0.031 | 0.062 | 0.107 |
| Pattern O | 178 | 60 | 209 | 149 | 1.2% | 8.58 | 6.32 | 0.70 | 28.60 | 0.031 | 0.062 | 0.107 |
| Pattern B | 175 | 67 | 199 | 131 | 4.0% | 7.83 | 5.42 | 1.05 | 24.68 | 0.125 | 0.125 | 0.306 |
| Pattern D | 163 | 65 | 194 | 129 | 2.1% | 7.22 | 4.82 | 1.40 | 21.67 | 0.250 | 0.250 | 0.613 |
| Pattern E | 163 | 75 | 202 | 128 | 2.2% | 7.53 | 5.12 | 0.88 | 23.78 | 0.188 | 0.188 | 0.459 |
| Pattern J | 166 | 96 | 208 | 112 | 5.3% | 7.22 | 4.82 | 0.70 | 22.88 | 0.250 | 0.250 | 0.613 |
| Pattern Q | 176 | 112 | 209 | 97 | 2.4% | 10.54 | 8.13 | 0.70 | 36.12 | 0.563 | 0.063 | 0.878 |
| Standard CPET | 133 | 97 | 178 | 82 | 3.1% | | | | | | | |
| Pattern S | 144 | 142 | 200 | 57 | 3.5% | 7.20 | 4.80 | 0.76 | 22.69 | 0.255 | 0.247 | 0.617 |

Similarly, another measure of acceptable performance in the industry is uniformity of internal temperature. As illustrated in Table 2, the patterns whose aperture dimensions 28, 31, 33 and 37° F., respectively which is typical and acceptable.

TABLE 2

Data and analysis sorted according to the temperature range of the food product

| Aperture Pattern | Temp. (° F.) | | | | Weight Loss | Aperture Dimension (inches) | | | | | | |
|---|---|---|---|---|---|---|---|---|---|---|---|---|
| | Mean | Range | Max | Min | | L | W | r | P | Del L | Del W | Sum del |
| Pattern I | 196 | 28 | 208 | 180 | 2.7% | 8.73 | 6.02 | 0.70 | 28.30 | 0.063 | 0.000 | 0.091 |
| Pattern A | 181 | 29 | 199 | 170 | 3.9% | 8.43 | 6.02 | 0.70 | 27.70 | 0.000 | 0.000 | 0.000 |
| Pattern R | 200 | 31 | 212 | 181 | 2.9% | 8.40 | 6.00 | 0.70 | 27.60 | 0.006 | 0.004 | 0.013 |
| Pattern G | 195 | 31 | 206 | 175 | 4.1% | 8.43 | 6.02 | 1.05 | 27.09 | 0.000 | 0.000 | 0.000 |
| Pattern N | 199 | 33 | 214 | 181 | 1.7% | 8.43 | 6.32 | 0.70 | 28.29 | 0.000 | 0.062 | 0.062 |
| Pattern C | 190 | 37 | 205 | 169 | 2.4% | 8.13 | 5.72 | 1.58 | 24.98 | 0.063 | 0.063 | 0.153 |
| Pattern F | 189 | 37 | 209 | 172 | 3.4% | 8.43 | 5.72 | 1.05 | 26.49 | 0.000 | 0.063 | 0.063 |
| Pattern H | 191 | 38 | 207 | 170 | 1.0% | 8.43 | 5.42 | 1.05 | 25.89 | 0.000 | 0.125 | 0.125 |
| Pattern P | 194 | 39 | 209 | 170 | 1.7 | 8.40 | 6.00 | 0.13 | 28.59 | 0.005 | 0.005 | 0.012 |
| Pattern L | 190 | 44 | 203 | 159 | 2.5% | 8.58 | 5.72 | 0.70 | 27.39 | 0.031 | 0.062 | 0.107 |
| Pattern M | 187 | 55 | 217 | 162 | 1.9% | 8.13 | 6.02 | 0.70 | 27.09 | 0.062 | 0.000 | 0.090 |
| Pattern K | 198 | 56 | 219 | 163 | 1.8% | 8.13 | 6.32 | 0.70 | 27.69 | 0.062 | 0.063 | 0.153 |
| Pattern O | 178 | 60 | 209 | 149 | 1.2% | 8.58 | 6.32 | 0.70 | 28.60 | 0.031 | 0.062 | 0.107 |
| Pattern D | 163 | 65 | 194 | 129 | 2.1% | 7.22 | 4.82 | 1.40 | 21.67 | 0.250 | 0.250 | 0.613 |
| Pattern B | 175 | 67 | 199 | 131 | 4.0% | 7.83 | 5.42 | 1.05 | 24.68 | 0.125 | 0.125 | 0.306 |
| Pattern E | 163 | 75 | 202 | 128 | 2.2% | 7.53 | 5.12 | 0.88 | 23.78 | 0.188 | 0.188 | 0.459 |
| Pattern J | 166 | 96 | 208 | 112 | 5.3% | 7.22 | 4.82 | 0.70 | 22.88 | 0.250 | 0.250 | 0.613 |
| Standard CPET | 133 | 97 | 178 | 82 | 3.1% | | | | | | | |
| Pattern Q | 176 | 112 | 209 | 97 | 2.4% | 10.54 | 8.13 | 0.70 | 36.12 | 0.563 | 0.063 | 0.878 |
| Pattern S | 144 | 142 | 200 | 57 | 3.5% | 7.20 | 4.80 | 0.76 | 22.69 | 0.255 | 0.247 | 0.617 |

As illustrated in Tables 1 and 2, the containers having apertures whose dimensions were sized within $1/8\lambda$ of the energy maxima were more effective in achieving the required minimum temperature and a satisfactory temperature distribution as compared to those containers having apertures whose dimensions deviated substantially from the energy maxima. The above experiments illustrate that sizing at least one dimension of an aperture about an energy maxima provides for accelerated cooking time, a more uniform temperature distribution, and enhanced moisture retention and elimination or reduction of overcooked or burnt food product edges. Preferably, however, sizing both the length and width dimensions about an energy maxima provides for a more improved heating uniformity and an even faster cooking time as compared to sizing only one dimension within $1/8\lambda$ of the energy maximum.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A microwaveable container for use in a microwave oven, the container having a base and side wall extending from the base and the container having a plurality of dimensions, the container including:
   a laminate structure including a first layer of microwave-transparent material and a second layer of microwave-reflective material;
   the second layer having at least one aperture defined therein, the at least one aperture having a width dimension W, a length dimension L, and a perimeter dimension P,
   wherein at least one of the width dimension W or length dimension L is sized within $1/8\lambda$ of a microwave energy peak for an operating frequency of about 2.45 GHz and each of the width dimension and length dimension is sized independent of the dimensions of the container and independent of a size and a type of food product in the container.

2. The container of claim 1, wherein the at least one aperture defined within the second layer is disposed at the base.

3. The container of claim 1, wherein the second layer is coextensive with the first layer across the base and side wall.

4. The container of claim 1, wherein the laminate structure further includes a third layer of microwave-transparent material, wherein the third layer is coextensive with the first layer and the second layer.

5. The container of claim 1, wherein the base and side wall are configured to define a structure selected from the group consisting of a tray, carton, package, box, shell, sleeve and bag.

6. A method of manufacturing a microwavable receptacle for use in a microwave oven, the receptacle configured to receive a container containing a food product therein, the receptacle having a plurality of dimensions, the method including:
   providing a first layer of microwave-transparent material;
   providing a second layer of microwave-reflective material;
   defining at least one aperture within the second layer, the at least one aperture having a width dimension W, a length dimension L, and a perimeter dimension P;
   wherein at least one of the width dimension W or length dimension L is sized within $1/8\lambda$ of a microwave energy peak for an operating frequency of about 2.45 GHz and each of the width dimension and length dimension is sized independent of the dimensions of the receptacle and independent of a size and a type of food product in the container;
   combining the first layer of microwave-transparent material and the second layer of microwave-reflective material to define a laminate member; and
   shaping the laminate member into a receptacle having a base and a side wall.

7. The method of claim 6, wherein the base is defined by a geometric shape and the at least one aperture is defined by a shape corresponding to the geometric shape of the base.

8. A microwaveable receptacle for use in a microwave oven, the receptacle configured to receive a container containing a food product therein, the receptacle having a plurality of dimensions, the receptacle comprising:
   a base and a side wall extending from the base formed of a laminate structure;
   the laminate structure including a first layer of microwave-transparent material and a second layer of microwave-reflective material;
   the second layer having at least one aperture defined therein, the at least one aperture having a width dimension W, a length dimension L, and a perimeter dimension P,
   wherein at least one of the width dimension W or length dimension L is sized within $1/8\lambda$ of a microwave energy peak for an operating frequency of about 2.45 GHz and each of the width dimension and length dimension is sized independent of the dimensions of the receptacle and independent of a size and a type of food product in the container.

9. The receptacle of claim 8, wherein the microwave-transparent material is selected from a group of materials consisting of paperboard, plastic, polyethyleneterephthalate (PET), including homopolymer and copolymer variations, polybutylenetherphthalate (PBT), polyolefins, polyethylenenaphthalate and copolymer variations, acrylics, acrylates, nylons, polyamides and molded fibers.

10. The receptacle of claim 8, wherein the microwave-reflective material is selected from a group of materials consisting of aluminum, copper, gold, silver, platinum and alloys thereof.

11. The receptacle of claim 8, further including a top member disposed adjacent to an edge of the side wall.

12. The receptacle of claim 11, wherein the at least one aperture defined within the second layer is disposed at the top member of the receptacle.

13. The receptacle of claim 12, wherein the base, side wall and top member are configured to define a package for enclosing a container.

14. The receptacle of claim 11, wherein the top member of the receptacle is essentially free of microwave-reflective material.

15. The receptacle of claim 8, wherein the side wall extends from at least two sides of the base and the receptacle is configured to define a sleeve to surround a container disposed within the receptacle.

16. An apparatus for use in a microwave oven, the apparatus comprising:
   a container to contain a food product therein;
   a microwaveable receptacle to receive the container, the receptacle comprising a base and a side wall extending from the base formed of a laminate structure, the receptacle having a plurality of dimensions, the laminate structure including a first layer of microwave-transparent material and a second layer of microwave-reflective material;

the second layer having at least one aperture defined therein, the at least one aperture having a width dimension W, a length dimension L, and a perimeter dimension P, wherein at least one of the width dimension W or length dimension L is sized within $\frac{1}{8}\lambda$ of a microwave energy peak for an operating frequency of about 2.45 GHz and each of the width dimension and length dimension is sized independent of the dimensions of the receptacle and independent of a size and a type of food product in the container.

17. The apparatus of claim 16, wherein the container is formed from a microwave-transparent material.

18. The apparatus of claim 16, wherein the perimeter dimension P of the at least one aperture is tuned to establish a peak energy ring within the container.

19. The apparatus of claim 16, further including a top member disposed adjacent to an edge of the side wall.

20. The apparatus of claim 19, wherein the base, side wall and top member are configured to define a package for enclosing a container.

21. The apparatus of claim 16, wherein the side wall extends from at least two sides of the base and the receptacle is configured to define a sleeve to surround a container disposed within the receptacle.

* * * * *